United States Patent [19]
Clark et al.

[11] Patent Number: 5,161,064
[45] Date of Patent: Nov. 3, 1992

[54] RADIATION SOURCE FOR A PRINTER

[75] Inventors: Peter P. Clark, Acton; Carmina Londono, Arlington, both of Mass.

[73] Assignee: Polaroid Corporation, Cambridge, Mass.

[21] Appl. No.: 616,348

[22] Filed: Nov. 21, 1990

[51] Int. Cl.⁵ .............. G02B 13/08; G02B 13/18; G02B 27/42
[52] U.S. Cl. .................. 359/663; 359/558; 359/668; 359/711
[58] Field of Search ............ 359/663, 711, 558, 668, 359/669, 671

[56] References Cited

U.S. PATENT DOCUMENTS

| | | | |
|---|---|---|---|
| 4,384,297 | 5/1983 | Ohara et al. | 346/108 |
| 4,403,235 | 9/1983 | Fedder et al. | 346/160 |
| 4,445,125 | 4/1984 | Scifres et al. | 346/108 |
| 4,538,895 | 9/1985 | Higgins et al. | 355/3 R |
| 4,743,091 | 5/1988 | Gelbart | 359/819 X |
| 4,744,073 | 5/1988 | Sugiki | 369/112 |
| 4,786,918 | 11/1988 | Thornton et al. | 346/108 |
| 4,806,951 | 2/1989 | Arimoto et al. | 346/108 |

*Primary Examiner*—Scott J. Sugarman
*Attorney, Agent, or Firm*—Francis J. Caufield

[57] ABSTRACT

Source of laser radiation for a printer includes at least one laser diode array and an optical system which is telecentric in at least one azimuth for imaging the near field distribution from the laser diode array(s) on a recording medium.

11 Claims, 6 Drawing Sheets

RADIATION SOURCE FOR A PRINTER

BACKGROUND OF THE INVENTION

1. Field of the Invention

The present invention pertains to method(s) and apparatus for providing a source of radiation and, in particular, for providing a source of radiation for use in digital printing applications.

2. Description of the Prior Art

Semiconductor lasers and laser diodes, in particular, have been popular for nearly a decade now in applications such as optical communications and compact audio disks. Laser diodes are advantageous for use in such applications because of their small size, high efficiency, and remarkable durability. Even so, the more widespread use of laser diodes has been limited by their low power output (typically a few milliwatts), poor spatial quality, and relatively small number of output wavelengths. As a result, their use has largely been limited to applications which do not require a high intensity, uniform source at one of the available output wavelengths.

In printing and copier applications where the output wavelength matches the spectral sensitivity of the medium and available power is sufficient for exposure requirements, laser diodes can be advantageously used because they can be directly modulated at high rates. However, their use has been successful primarily with highly sensitive media.

Consequently, a laser printer or copier, which is to print on a radiation—sensitive or thermally—sensitive recording medium in accordance with a threshold physical phenomenon typically requires a high power source of printing radiation. For example, for a typical recording medium, there is a 1:3 intensity ratio from threshold excitation of the recording medium to its destruction. As a result, the printing radiation is required to be focused onto the recording medium as a spot which has a substantially smooth, uniform intensity thereacross— where a substantially smooth, uniform intensity means that the peak to valley intensity ratio in the spot is smaller, within engineering tolerance, than the threshold to burn-off ratio of the recording medium.

Figure 1:
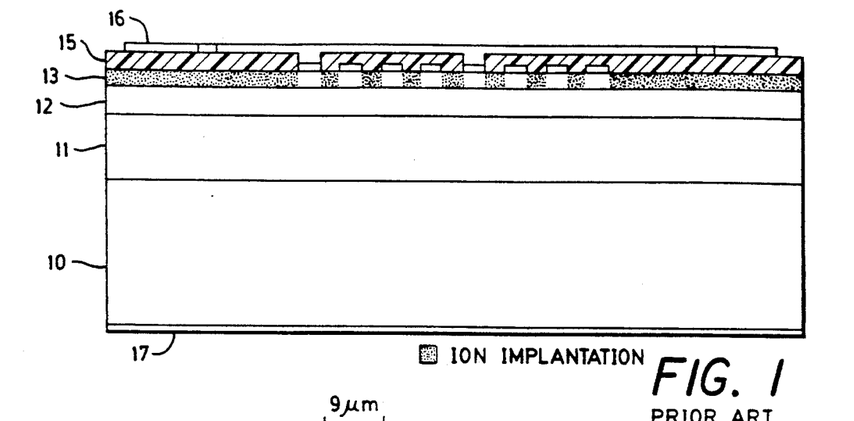
FIG. 1 shows, in pictorial form, a laser diode array disclosed in the prior art.
Figure 2:
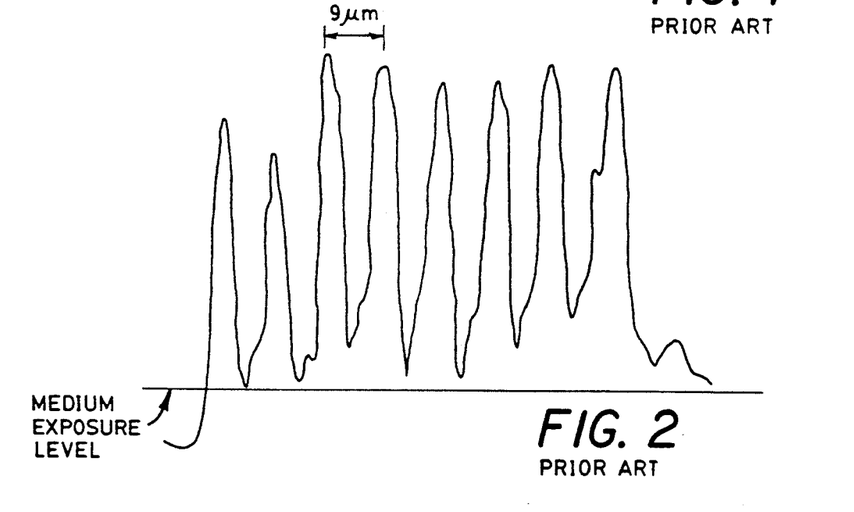
FIG. 2 shows, in pictorial form, the near field distribution of a laser diode array.

The use of such a thermally sensitive recording medium in a printer prohibits the use of a single laser diode to provide the printing radiation because a single laser diode typically outputs an amount of power in the range between 20 mW to 50 mW, and this amount of power is insufficient to provide proper activation of a typical recording medium. As a consequence, a typical laser printer needs to utilize an array comprised of a multiplicity of laser diodes to provide an amount of radiative power which is suitable for printing. For example, a typical laser printer application might utilize an array comprised of as many as ten laser diodes which are fabricated on the same semiconductor chip. In fact, some reports in the prior art disclose the achievement of 500 mW of power for a laser diode array containing 10 laser diodes which were configured in a linear fashion such as in the configuration shown in FIG. 1. In such a configuration, the near field distribution, i.e., the output spatial intensity distribution within a wavelength or so from the laser diode array, looks like the comb pattern shown in FIG. 2, FIG. 2 being FIG. 4a from U.S. Pat. No. 4,744,616. In addition, the far field distribution, i.e., the output spatial intensity distribution which begins to take shape a distance of several wavelengths from the laser diode array, but defined by convention as the output spatial intensity distribution observed at infinity, looks like the dual lobe pattern shown in FIG. 3, FIG. 3 being FIG. 7 from U.S. Pat. No. 4,791,651. Although the far field distribution contains sufficient power to fulfill the exposure requirements in many printing applications, it is virtually useless for providing a printing beam for a recording medium which requires a substantially uniform radiation exposure for tone control because the energy is substantially concentrated in the dual lobes shown in FIG. 3.

Figure 3:
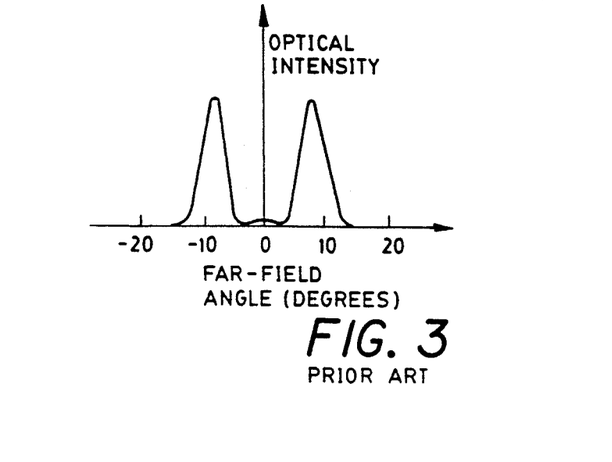
FIG. 3 shows, in pictorial form, the far field distribution of a laser diode array.

The far field distribution shown in FIG. 3 is produced by an interference phenomenon wherein the output from each of the individual laser diode junctions of the laser diode array adds slightly off-axis and reduces on-axis. This occurs because of cross coupling between the laser diode waveguides, which cross coupling, if it is allowed to dominate the operation of the array, causes adjacent laser diode junctions to emit out of phase by 180 degrees. Because of this interference phenomenon, such a laser diode array is often referred to as a phased laser diode array.

Workers in the prior art have proposed various methods to eliminate the dual lobes in the far field distribution shown in FIG. 3 and to make the spatial intensity pattern more uniform. Specifically, these methods have been addressed to making the laser diode arrays incoherent or randomly phased, i.e., having no definite, regular phase relationship between adjacent laser diode junctions. When a laser diode array is made incoherent, the far field distribution becomes Gaussian, or nearly so, instead of the dual lobed distribution shown in FIG. 3. This is advantageous because a Gaussian distribution can be optically transformed into a "top hat" or "square" distribution which is substantially uniform in intensity, or uniform enough, so that both the uniformity and intensity requirements of a recording medium are satisfied for many area modulation printing applications.

Despite the above, the extra electronic and optical apparatus which are required to provide a "top hat" far field distribution add complexity and expense to a radiation source. Thus, there is a need for a radiation source which utilizes a laser diode array without having to provide a "top hat" far field distribution.

SUMMARY OF THE INVENTION

Embodiments of the present invention satisfy the above-identified need and provide a radiation source for use in printing upon a recording medium in, for example, a digital halftone printer. In particular, an embodiment of the inventive source comprises a laser diode array and an optical system which is telecentric in at least one azimuth for imaging the near field distribution from the laser diode array on a medium.

Embodiments of the present invention are advantageously used with a threshold, binary recording medium, i.e., a recording medium which has two states and which requires a minimum threshold exposure before it changes from an unexposed state to a fully exposed state, for example, from white to black or vice versa. With such a recording medium, digital halftone reproduction can be achieved by imaging the near field distribution of a laser diode array onto the medium so that the energy density over the image exceeds the minimum threshold exposure of the medium. It is understood that, in accordance with the present invention, a laser diode array having a near field distribution which is predictably stable within predetermined tolerances is used so that the peaks and valleys of the near field distribution are spaced a small enough distance from one another so that, for purposes of exposing the medium, the near field distribution can be considered to be a nearly uniform, rectangular source. This ensures that the near field distribution uniformly exposes the medium, i.e., it prevents the peaks and valleys of the near field distribution from exposing the medium in some parts of the image of an array an not in others.

In accordance with the present invention, the telecentric optical system advantageously separates the image of the near field distribution of the laser diode array from the image of the far field distribution of the laser diode array. This is important because, in practice and without the use of a telecentric optical system, defocusing errors of only a few millimeters can create a sharpley focussed image of the far field distribution on the recording medium. As a result, such defocusing would create exposure problems because, as was discussed above and shown in FIG. 3, the differences between the intensities at the peaks and minima of the far field distribution are so great that the recording medium would be exposed at the peaks and not at the minima. In addition, in accordance with the present invention, a telecentric optical system advantageously ensures that the size of the image of the near field distribution of the laser diode array on the recording medium will be relatively insensitive to median departures from the plane of optimal focus.

DESCRIPTION OF THE DRAWINGS

The novel features that are considered characteristic of the present invention are set forth with particularity herein, both as to their organization and method of operation, together with other objects and advantages thereof, and will be best understood from the following description of the illustrated embodiments when read in connection with the accompanying drawings wherein.

DETAILED DESCRIPTION

Figure 4:
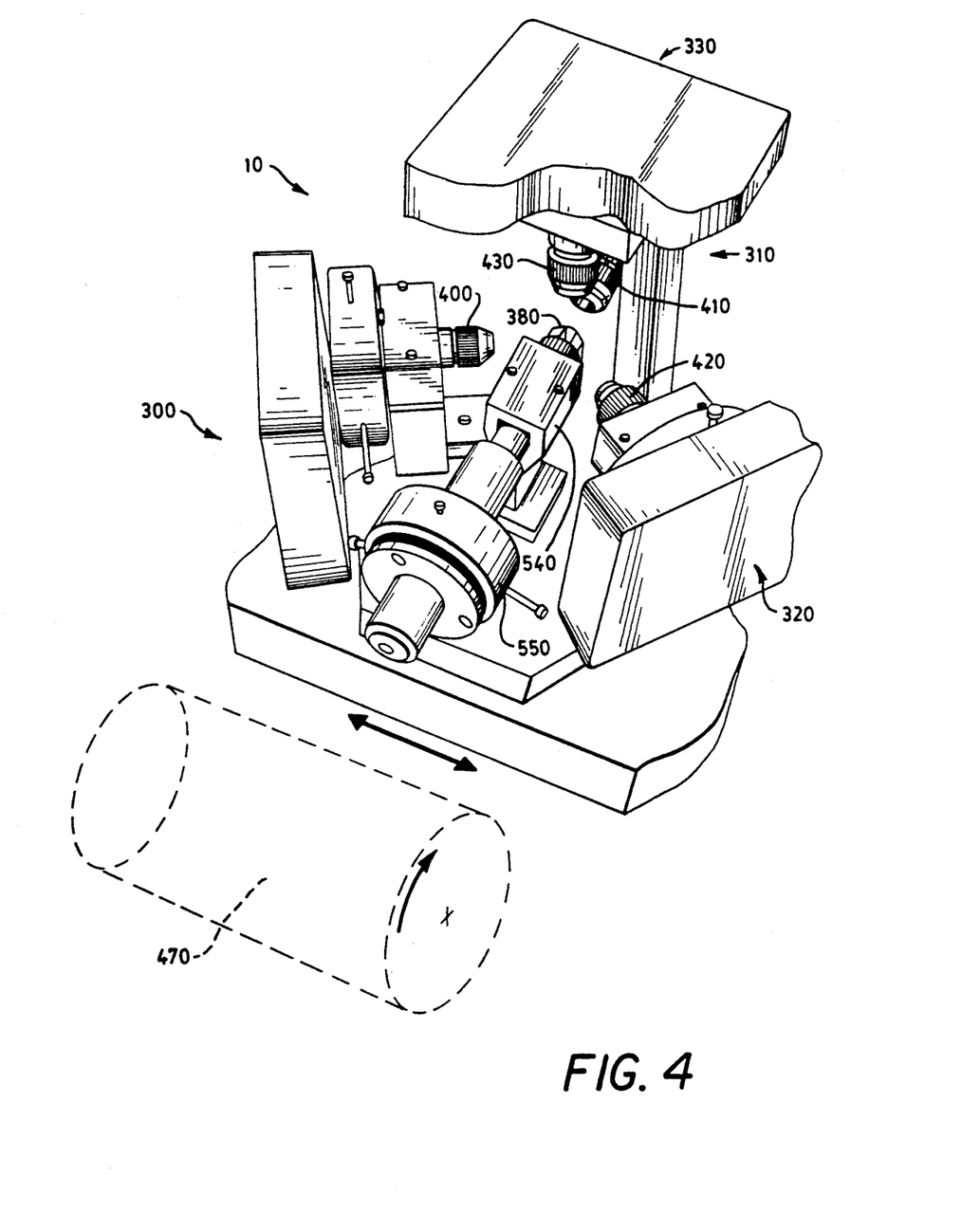
FIG. 4 shows, in pictorial form, a perspective view of an embodiment of the present invention.
Figure 5:
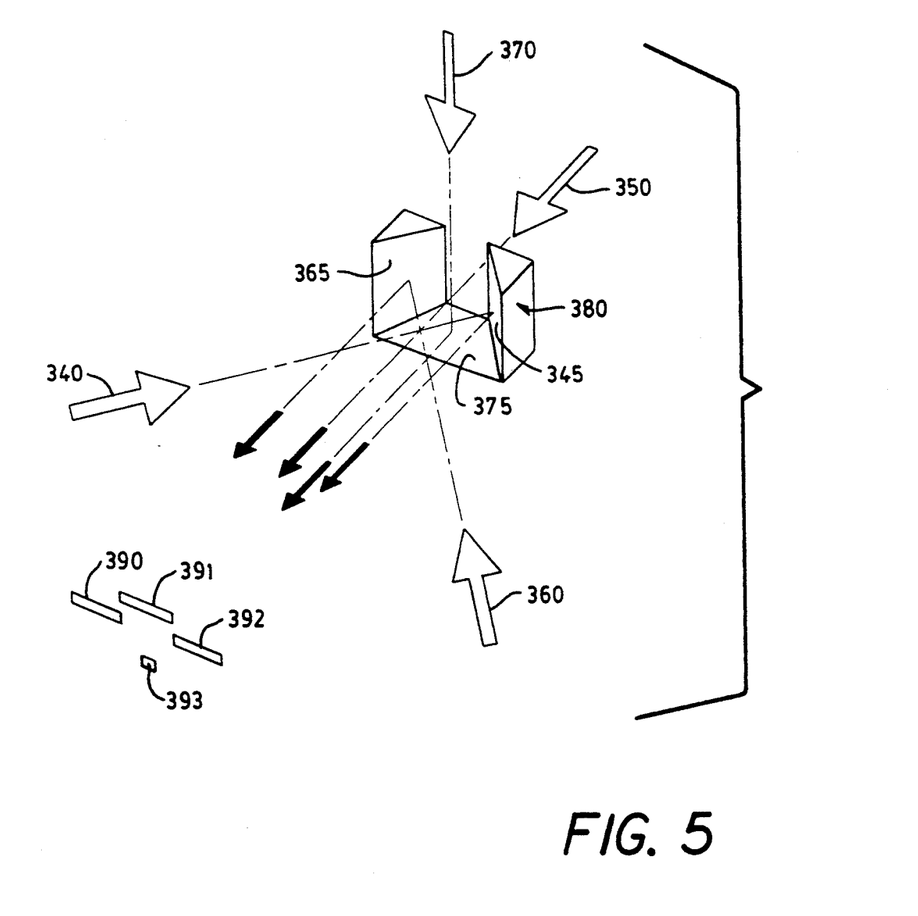
FIG. 5 shows, in pictorial form, the manner in which the laser radiation produced by the laser diode arrays of FIG. 4 is combined to provide a laser radiation beam for halftone printing.

FIG. 4 shows a perspective view of optical system 10 which is fabricated in accordance with the present invention. The near field distributions from separated laser diode arrays 300-330 are imaged by illuminators 400-430, respectively. As shown in FIG. 5, beams of radiation 340, 360, and 370 are output from laser diode arrays 300, 320, and 330, respectively. Beams 340, 360, and 370 are imaged onto facets 345, 365, and 375, respectively, of mirror 380 and beam of radiation 350 from laser diode array 310 travels directly through a central gap in mirror 380. As a result, and as illustrated in FIG. 5, beams 340-370 travel alongside each other and ultimately pass through the remainder of optical system 10 to form a sharply focused pattern of dots 390-393 for providing a halftone image on thermally sensitive, binary recording medium 470 mounted on a rotating drum. It should be clear to those of ordinary skill in the art that the radiation from laser diode arrays 300-330 may also be combined by means of prisms, gratings, cleaved crystals and so forth.

Figure 6:
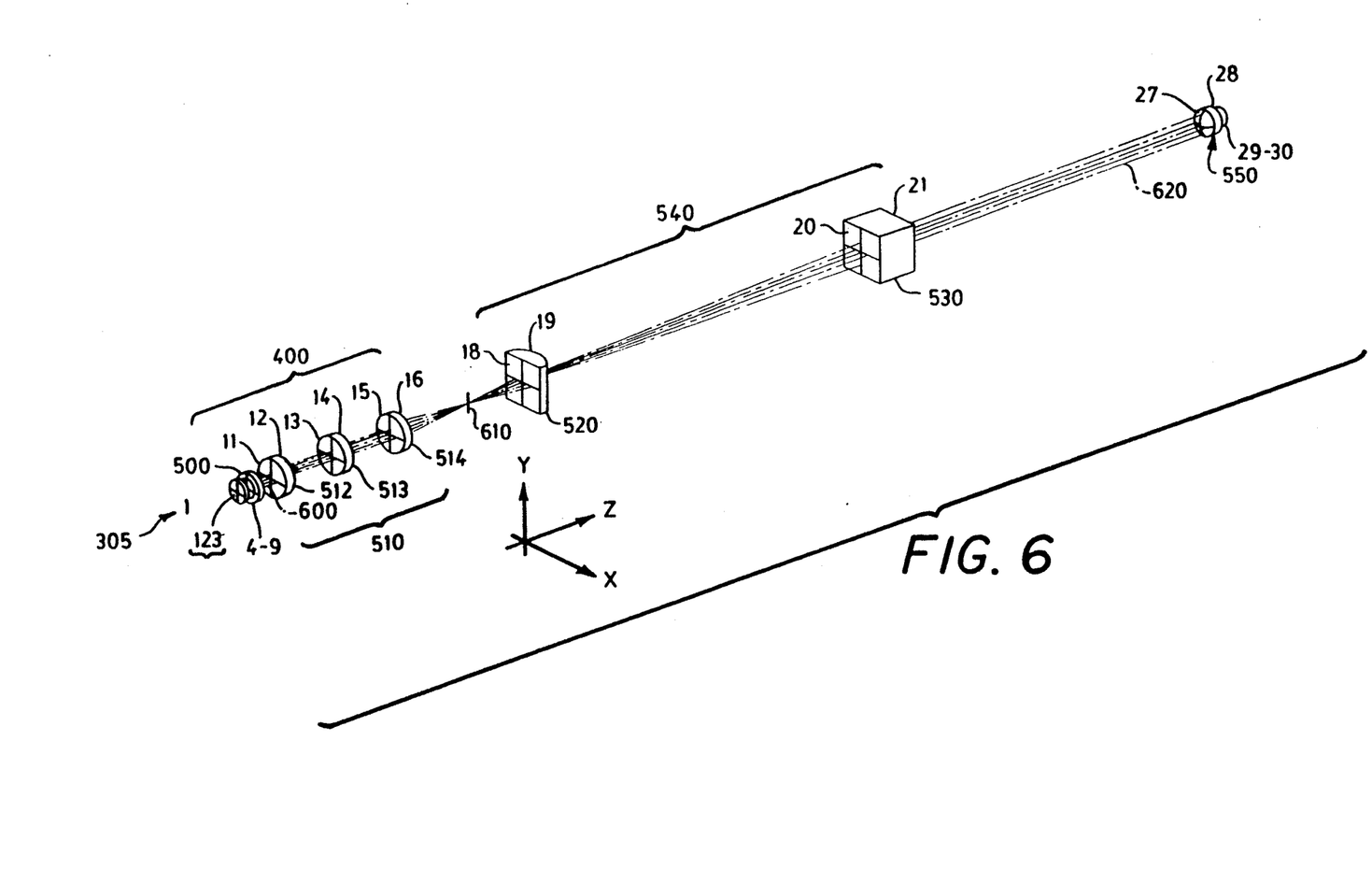
FIG. 6 shows, in pictorial form, a schematic perspective view of the optical system which forms dot 390 shown in FIG. 5.

In accordance with the embodiment of the present invention shown in FIG. 4, the optical system for each of laser diode arrays 300 and 320 is comprised of an illuminator, i.e., illuminators 400 and 420, respectively, an anamorphic module 540 and objective lens system 550 (See FIG. 6). Anamorphic module 540, as will be explained in more detail below, provides shaping and collimation for the beams. Objective lens system 550, as will be explained in more detail below, forms the final image of the reproportioned images on recording medium 470. (The optical systems for laser diode arrays 310 and 330 will be discussed in more detail below). In accordance with the present invention, the optical system for each of laser diode arrays 300-330 is telecentric in at least one azimuth and, as a result, the chief rays output therefrom are parallel to the optic axis thereof in at least one azimuth. For the particular embodiment shown in FIGS. 4 and 5 and discussed below, the optical systems for laser diode arrays 300 and 320 are telecentric in the azimuth across the longer dimension of dots 390 and 392. In this embodiment, the optical systems for laser diode arrays 300 and 320 need not necessarily be telecentric in the azimuth across the shorter dimension of dots 390 and 392 because laser diode arrays 300 and 320, for practical purposes, appear to be a line in this shorter dimension.

The requirement that the optical systems for laser diode arrays 300 and 320 be telecentric is important. This is so because the telecentric optical systems for arrays 300 and 320 ensure that the far field distributions of arrays 300 and 320 are maximally out of focus, i.e., the far field distributions are focused at infinity. As a result, defocusing errors in the optical systems are prevented from inadvertently imaging the far field distributions of laser diode arrays 300 and 320 on recording medium 470. In addition, an added benefit arising from the use of a telecentric optical system is that the size of the image of the near field distributions from the laser diode arrays does not change asymmetrically, i.e., become shorter or longer by different amounts, on either side of the proper focus. In other words, the effective depth of focus of the telecentric optical system is large, and the size of the image of the near field distributions from laser diode arrays 300 and 320 remain substantially the same in the face of defocusing errors. This is advantageous for reliable halftone or area modulation image reproduction where the size of the dots must be carefully controlled to be within predetermined bounds.

The present invention will now be described by referring to a particular embodiment wherein laser diode arrays 300-330 each has a near field distribution with a rectangular cross section whose size is approximately 1 $\mu m \times 88$ $\mu m$. The near field distributions from laser diode arrays 300-320 are imaged onto recording medium 470, as shown in FIG. 5, as rectangular dots 390-392, each having a size of 3 $\mu m \times 30$ $\mu m$, more or less, and as rectangular dot 393 having a size of 3 $\mu m \times 5$ $\mu m$, more or less. Dots 390-393 provide a printing beam for use in providing an area modulated pixel exposure pattern on recording medium 470.

We now turn to a description of how optical system 10 provides dots 390 and 392 shown in FIG. 5. The portion of optical system 10 which provides dot 390 and the portion of optical system 10 which provides dot 392 operate in a similar manner and, for simplicity, only the portion which provides dot 390 will be described.

As is shown in FIG. 6, the portion of optical system 10 which provides dot 390 is comprised of illuminator 400, anamorphic module 540 and objective lens system 550. For further ease of understanding this embodiment and for purposes of providing one of ordinary skill in the art with an appreciation of the optical system shown in FIG. 6, it is assumed, for the moment, that illuminator 400 is, itself, telecentric. Illuminator 400 is not required to be telecentric in practice since, in accordance with the present invention only the optical system shown in FIG. 6, as a whole, is required to be telecentric. Further, if illuminator 400 were telecentric then, as one of ordinary skill in the art can readily appreciate, the length of the embodiment shown in FIG. 6 would be determined by the focal lengths of the lens systems and, as a result, mostly by the long focal length of lens 530. Thus, in practice, the optical system of FIG. 6 which is comprised of illuminator 400, anamorphic module 540 and objective lens system 550 can be made shorter, while still maintaining its overall telecentric nature, by shifting a group of optical elements comprised of objective optical system 510, lens 520 and lens 530 towards objective lens system 550 and by shifting collimator lens system 500 towards the group in such a manner as to maintain the same conjugate points. Since 510 and 530 form an afocal telescope in the x-direction, such a shift which maintains conjugate points can result in a shortening of the length of the overall optical system between conjugate points by an amount which is proportional to the magnification squared minus one.

As shown in FIG. 6, near field distribution 305 from laser diode array 300 has a size which is substantially equal to 1 $\mu m \times 88$ $\mu m$. The radiation from laser diode array 300 impinges upon illuminator 400. As was stated above, for ease of understanding, illuminator 400 is a telecentric optical system which is comprised of collimator lens system 500 and objective optical system 510. In this embodiment, collimator lens system 500 is: (a) aspheric to provide aberration control and to ensure reasonably accurate collimation and (b) rotationally symmetric for ease of manufacture. Near field distribution 305 from laser diode array 300 is disposed substantially in the front focal plane of collimator lens system 500.

To provide that illuminator 400 is telecentric, the back focal plane of collimator lens system 500 is located substantially at the front focal plane of objective optical system 510. Objective optical system 510 is comprised of plano-convex lens 512, plano-concave lens 513, and plano-convex lens 514.

As a result, as shown in FIG. 6, far field distribution 600 is formed in the back focal plane of collimator lens system 500 and is aligned substantially perpendicular to the orientation of near field distribution 305, i.e., perpendicular to the orientation of the laser diode junctions in laser diode array 300. In addition, collimator lens system 500 and objective optical system 510 provide magnification of near field distribution 305 in order to reduce the numerical aperture of the system.

The enlarged image of near field distribution 305 from laser diode array 300 appears at the back focal plane of objective optical system 510 at the position indicated by 610. Position 610 is, in practice, the surface of mirror facet 345 which is shown in FIG. 5 but which is omitted from FIG. 6 for ease of understanding. Further, as those of ordinary skill in the art can readily appreciate, the near field image at position 610 is a real image and provides the conjugate, intermediate image which is needed to provide an overall telecentric optical system.

Beyond position 610, rays from all the near field distributions of laser arrays 300-330 enter anamorphic module 540. Anamorphic module 540 serves as a common component in optical system 10 to shape and collimate all the radiation from all of the laser diode arrays, 300-330, in one azimuth. The use of a common anamorphic system results in a reduced cost for providing the radiation pattern.

Notwithstanding the fact that anamorphic module 540 is a common component in optical system 10 for imaging radiation from laser diode arrays 300-330, at this point, the description will only discuss how optical system 10 images near field distribution 305 from laser diode array 300.

Anamorphic module 540 is comprised of: (a) cylindrical lens 520 having its optical power disposed substantially perpendicular to the direction of the long dimension of the laser diode junctions of laser diode array 300 and (b) cylindrical lens 530 having its optical power disposed substantially parallel to the direction of the long dimension of the laser diode junctions of laser diode array 300. Where, for the sake of ease of understanding the embodiment, illuminator 400 is taken to be telecentric, the front focal plane of lens 520 is disposed substantially at the back focal plane of lens 510 and the back focal plane of lens 520 is disposed substantially at the front focal plane of lens 530. As a result, the combination of illuminator 400 and anamorphic module 540 is telecentric in an azimuth corresponding to the x-direction. It should be understood by those of ordinary skill in the art that lenses 520 and/or 530 could be a toric lens or that lenses 520 and 530 could be replaced by a pair of prisms or equivalents. However, it is preferred to use lenses instead of prisms in this embodiment because prisms present difficulties in alignment and are sensitive to the polarization of the radiation.

The radiation which emerges from anamorphic module 540 may, in some applications, pass through beamsplitters for autofocusing systems and so forth. Notwithstanding that, as shown in FIG. 6, the far field distribution which was focused at position 600 emerges from anamorphic module 540 at its conjugate position 620 which is disposed substantially in the front focal plane of objective lens system 550. The front focal plane of objective lens system 550 is disposed substantially at the back focal plane of lens 530. Thus, the optical system which is comprised of illuminator 400, anamorphic module 540 and objective lens system 550 is telecentric in the one azimuth and, as a result, it focuses near field distribution 305 to the required scale and pattern, i.e., 3 $\mu m \times 30$ $\mu m$ dot 390, and it focuses the far field distribution at infinity.

Finally, as was stated above, the length of the embodiment shown in FIG. 6 is determined by the focal lengths of the lenses and, mostly, by the focal length of lens 530. Thus, in practice, the optical system of FIG. 6 which is comprised of illuminator 400, anamorphic module 540 and objective lens system 550 is made shorter, while still maintaining its overall telecentric nature, by shifting a group of optical elements comprised of objective optical system 510, lens 520, and lens 530 towards objective lens system 550 and by shifting collimator lens system 500 towards the group in such a manner as to maintain the same conjugate points. As is well known to those of ordinary skill in the art, such a shift which maintains conjugate points can result in a shortening of the length of the overall optical system between conjugate points by an amount which is proportional to the magnification squared minus one.

Construction data for a preferred embodiment of the present invention is given in TABLE 1. The following information helps to understand the construction data. First, in general, the construction data give the location of the object and image planes, the shape of the elements, their composition and hence their optical properties, and the distance separating them along the optical axis. By convention, one starts with the object and light proceeds through the optical system from left to right, as shown in the figures. A surface is given and this is followed by the thickness to the next surface along with the material of the medium located along that distance. The material is left blank for air. The next surface is then identified and its radius of curvature is specified. This is followed again by the thickness to the next surface and the intervening material. In this manner the optical path length, physical distance multiplied by index of refraction, is determined.

Figure 7:
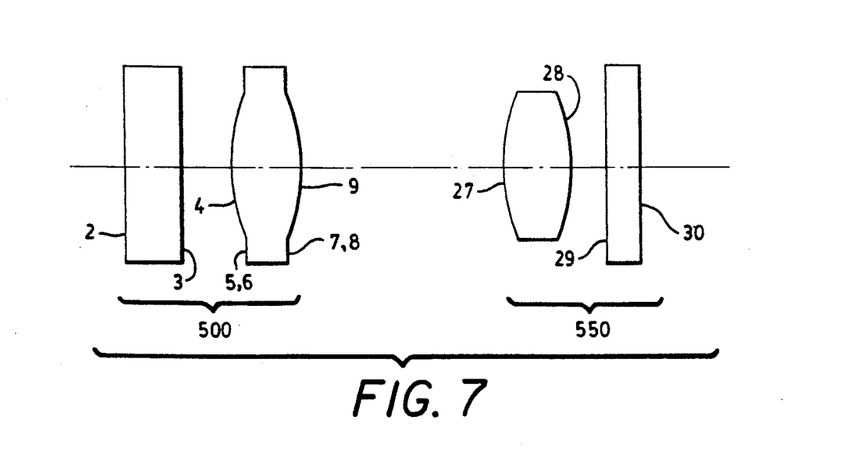
FIG. 7 shows, in pictorial form, a cross section of the collimator lens and the objective lens for the optical system shown in FIG. 6.

Aspherical surfaces are given by the following convention:

$$z(h) = \frac{ch^2}{1 + [1 - (1 + K)c^2h^2]^{\frac{1}{2}}} + Ah^4 + Bh^6 + Ch^8 + Dh^{10}$$

where $h^2 = x^2 + y^2$; c is the curvature at the pole of the surface (base curvature); K is the conic constant; and A, B, C, and D are the 4th, 6th, 8th, and 10th order deformation terms, respectively (for axially symmetric systems otherwise odd ordered terms would also be needed for nonrotational surfaces). When a surface is purely conical, i.e., $A = B = C = D = 0$, the conic surface type (CON) is used. Also, the surface coefficients can change with azimuth as with the anamorphics of this system, in which case some or most of them can be zero in one plane. Second, for use of Table 1, as shown in FIG. 7, collimating lens system 500 comprises a plate and an aspherical converging lens. The surfaces of the plate are designated surfaces 2 and 3 and the surfaces of the aspherical converging lens are designated as 4-9, surfaces 4 and 9 being curved and surfaces 5-7, being dummies to represent flanges. Further, as shown in FIG. 7, objective lens system 550 comprises a converging lens and a plate. The surfaces of the lens are designated surfaces 27 and 28 and the surfaces of the plate are designated surfaces 29 and 30. The surface designations for the other lenses in the optical system are indicated in FIG. 6. Lastly, surface 17 is the location of the mirror at position 610 in FIG. 6.

TABLE 1

| | RDY | THI | RMD | GLA | |
|---|---|---|---|---|---|
| OBJ: | INFINITY | 0.431800 | | | |
| 1: | INFINITY | 0.203200 | | SAPHIR_SPECIAL | |
| 2: | INFINITY | 1.001296 | | SF56_SCHOTT | |
| 3: | INFINITY | 1.143238 | | | |
| 4: | 9.38053 | 0.170000 | | 'cor' | |
| CON: | | | | | |
| K : −77.102039 | | KC: | 100 | | |
| 5: | INFINITY | 0.000000 | | | |
| 6: | INFINITY | 1.610000 | | 'cor' | |
| 7: | INFINITY | 0.000000 | | | |
| 8: | INFINITY | 1.290000 | | 'cor' | |
| 9: | −2.71855 | 3.426433 | | | |
| ASP: | | | | | |
| K : −0.801716 | | | | | |
| A : −.215980E-02 | B :−.231447E-04 | C :0.104290E-05 | | | |
| D :0.000000E+00 | | | | | |
| STO: | INFINITY | 0.000000 | | | |
| 11: | 27.10993 | 3.000000 | | SF56_SCHOTT | |
| 12: | INFINITY | 12.250000 | | | |
| 13: | INFINITY | 2.200000 | | SF56_SCHOTT | |
| 14: | 12.58157 | 12.050000 | | | |
| 15: | 14.40289 | 2.200000 | | SF56_SCHOTT | |
| 16: | INFINITY | 9.600000 | | | |
| 17: | INFINITY | 3.000000 | | BK7_SCHOTT | |
| XDE: 0.000000 | YDE: 0.000000 | ZDE: 0.000000 | | | DAR |
| ADE: 0.000000 | BDE: 33.000000 | CDE: 0.000000 | | | |
| 18: | INFINITY | 3.000000 | | SF1_SCHOTT | |
| XDE: 0.000000 | YDE: 0.000000 | ZDE: 0.000000 | | | DAR |
| ADE: 0.000000 | BDE: 3.321517 | CDE: 0.000000 | | | |
| 19: | INFINITY | 8.503157 | | | |
| XDE: 0.000000 | YDE: 0.000000 | ZDE: 0.000000 | | | DAR |
| ADE: 0.000000 | BDE: 29.650255 | CDE: 0.000000 | | | |
| 20: | INFINITY | 10.207941 | | | |
| XDE: −0.598756 | YDE: 0.000000 | ZDE: 0.000000 | | | |
| ADE: 0.000000 | BDE: 0.000000 | CDE: 0.000000 | | | |
| 21: | INFINITY | 4.000000 | | BK7_SCHOTT | |
| 22: | INFINITY | 82.487063 | | | |
| CYL: | | | | | |
| RDX: −6.56334 | | | | | |
| 23: | INFINITY | 8.890000 | | BK7_SCHOTT | |
| 24: | −51.67980 | 26.000000 | | | |
| CYL: | | | | | |
| RDX: INFINITY | | | | | |
| 25: | INFINITY | −10.854000 | REFL | | |
| XDE: 0.000000 | YDE: 0.000000 | ZDE: 0.000000 | | | BEN |
| ADE: 0.000000 | BDE: 30.000000 | CDE: 0.000000 | | | |
| 26: | INFINITY | 5.427000 | REFL | | |
| XDE: 0.000000 | YDE: 0.000000 | ZDE: 0.000000 | | | BEN |
| ADE: 0.000000 | BDE: −30.000000 | CDE: 0.000000 | | | |
| 27: | INFINITY | 18.238000 | | | |
| 28: | INFINITY | 6.000000 | | SF19_SCHOTT | |
| 29: | INFINITY | 1.442000 | | BK7_SCHOTT | |
| 30: | INFINITY | 3.800000 | | | |
| 31: | INFINITY | 3.915780 | | | |
| 32: | 3.14805 | 3.440000 | | 'cor' | |
| ASP: | | | | | |
| K : −0.859326 | | | | | |
| A :0.112229E-02 | B :0.574330E-05 | C :−.128826E-05 | D | | |
| :0.000000E+00 | | | | | |
| 33: | −10.37265 | 0.000000 | | | |
| CON: | | | | | |
| K : −34.775041 | | | | | |
| 34: | INFINITY | 1.149140 | | SF56_SCHOTT | |
| 35: | INFINITY | 0.036000 | | SK11_SCHOTT | |
| 36: | INFINITY | 1.974687 | | | |
| IMG: | INFINITY | 0.000000 | | | |

We now turn to a description of how optical system 10 provides dots 391 and 393 shown in FIG. 5. First, in order that dot 393 have a size which is equal to $3\mu \times 5$ μm, more or less, instead of 3 μm×30 μm, more or less, as is the case for dots 390–392, one may simply use a mask which is placed, for example, on mirror 380. As has been described above, mirror 380 has been omitted from FIG. 6 for sake of clarity, however, it would appear at a location which is disposed substantially at position 610.

Second, as shown in FIG. 4, optical system 10 is comprised of separate illuminators, i.e., illuminators 400–430, for each of laser diode arrays 300–330, respectively, and a common anamorphic module 540 and a common objective lens system 550. Further, illuminators 400 and 420 are identical. However, since optical system 10 is not telecentric in the Y-direction, dots 391 and 393 cannot be displaced in Y by simply decentering illiminators 410 and 430. Telecentricity can be restored by tilting illuminators 410 and 430, but coma is then introduced by cylindrical lens 520.

Figure 8A:
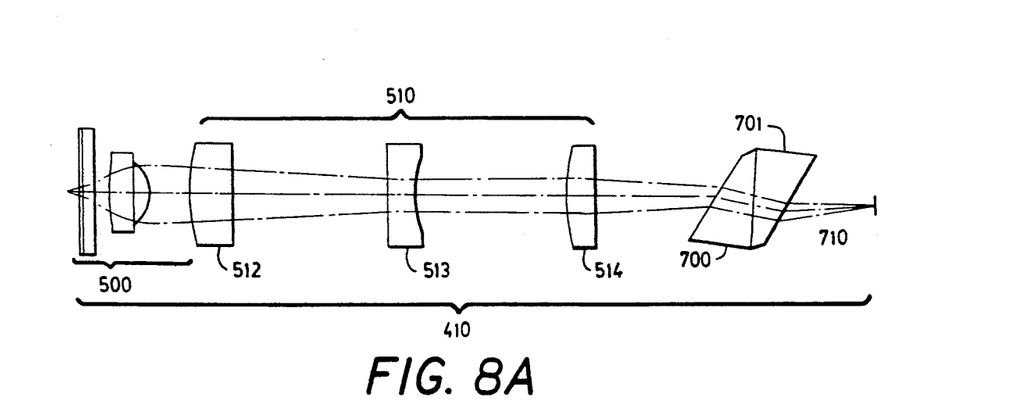
FIGS. 8A and 8B show, in pictorial form, a cross section of the illuminator portion of the optical system which forms dot 391 shown in FIG. 5 and a cross section of the illuminator portion of the optical system which forms dot 393 shown in FIG. 5.
Figure 8B:
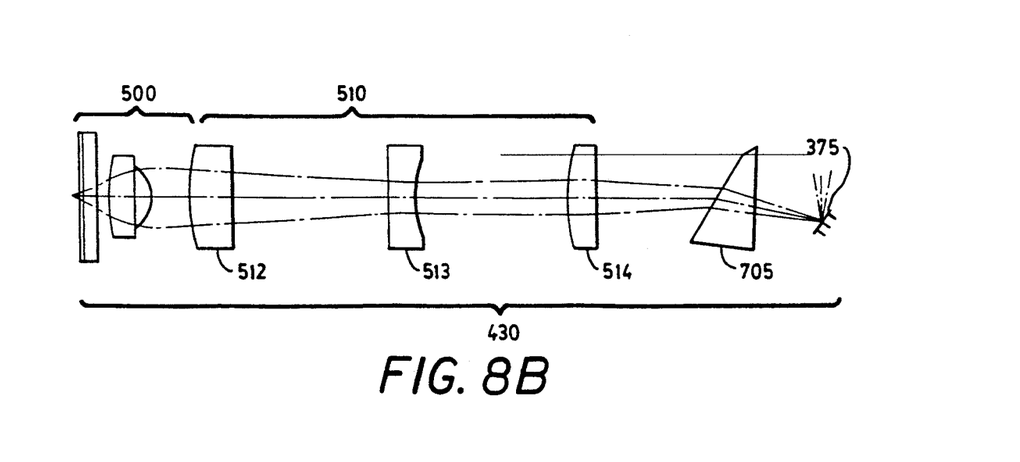

As shown in FIGS. 8A and 8B, illuminators 410 and 430 are comprised of a collimator which is the same as collimator lens system 500 of illuminator 400 and an objective which is the same as objective lens system 510 of illuminator 400. However, they are also comprised of further optical elements which are designed for the purposes of restoring telecentricity and removing coma. In particular, as shown in FIG. 8A, the optical elements which are thusly designed for illuminator 410 are prismatic wedges 700 and 701 and the optical elements which are thusly designed for illuminator 430 are prismatic wedge 705 and the inclination of mirror facet 375 as shown in FIG. 8B. Prismatic wedges 700 and 701 are inserted into illuminator 410 after the objective and before the intermediate image at position 710 and and prismatic wedge 705 is inserted into illuminator 430 after the objective and before mirror facet 375. The combination of prismatic wedges 700 and 701 for illuminator 410 and the combination of prismatic wedge 705 and the dip of mirror facet 375 for illuminator 430, respectively, causes the beam emerging from each illuminator to diverge a bit. This prevents any rays from missing the pupil of objective lens system 550, i.e., the chief rays are bent away from the axis, and corrects for coma of cylindrical lens 520. In fact, the chief rays are bent so that they will pass through the axis of long focal length lens 530. This bending provides that the overall optical system for laser diode arrays 310 and 330 is telecentric in the azimuth corresponding to the displacement of dots 391 and 393 from the line between dots 390 and 392. Although one could attempt to achieve a similar function by having illuminators 410 and 430 be identical to illuminator 400 and then by offsetting illuminators 410 and 430, this is undersirable because such a positioning would result in aberrations and, in particular, coma.

Figure 9:
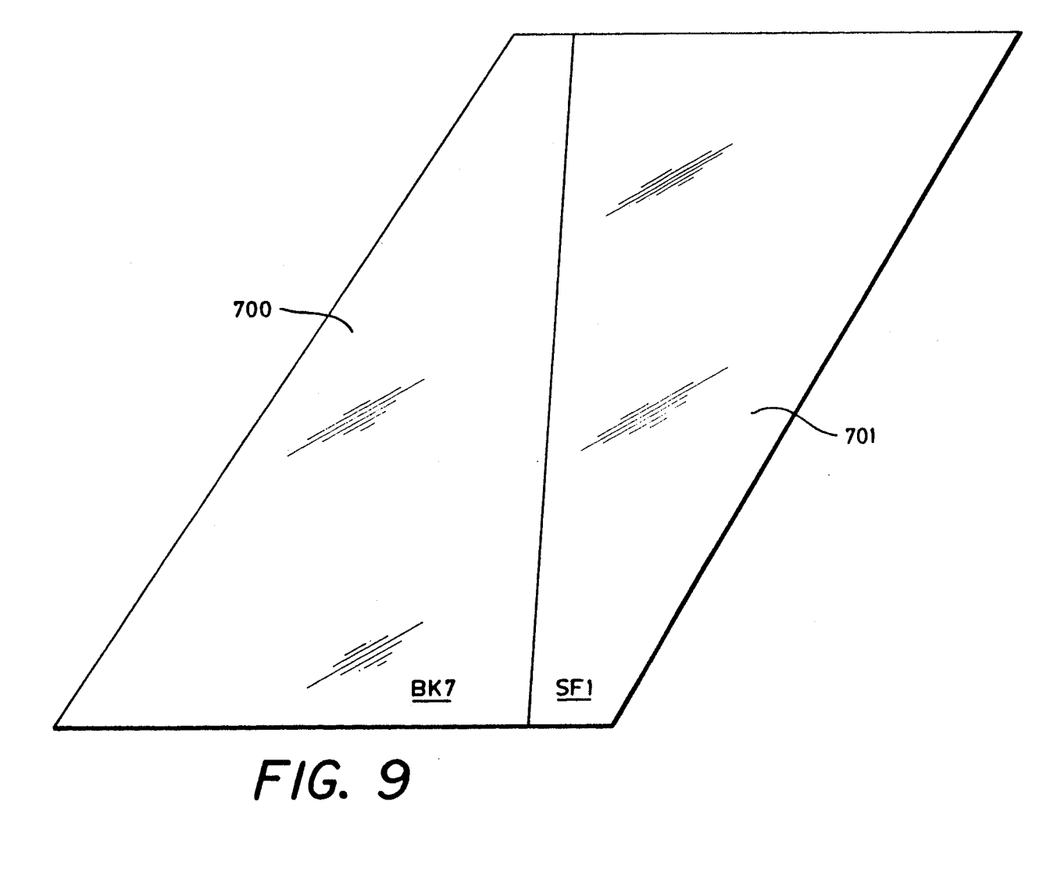
FIG. 9 shows, in pictorial form, a side view of the prismatic wedge pair used in the illuminator portion of the optical system which forms dot 391 shown in FIG. 5.
Figure 10:
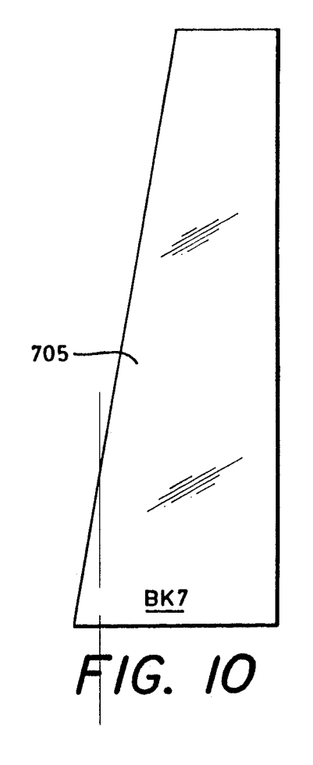
FIG. 10 shows, in pictorial form, a side view of the prismatic wedge used in the illuminator portion of the optical system which forms dot 393 shown in FIG. 5.

FIGS. 9A and B show, in pictorial form, a preferred embodiment of prismatic wedges 700 and 701 and FIGS. 10 A and B show, in pictorial form, a preferred embodiment of prismatic wedge 705. As indicated in FIGS. 9 A and B and 10 A and B, BK7 is a low index crown glass which is commercially available and SF1 is a high index flint glass which is also commercially available.

Wedges 700 and 701 are used in illuminator 410 since the beam which provides dot 391 does not impinge on mirror 380. Further, as shown in FIG. 9, wegdes 700 and 701 are comprised of different materials and the coma of wedges 700 and 701 are determined so that coma is corrected for the system comprised of wedges 700 and 701 and lens 520. In addition, as was discussed above, the coma of wedge 705 is determined so that coma is corrected for the system comprised of wedge 705, mirror facet 375, and lens 520.

Finally, as is well known to those of ordinary skill in the art, the images of the near field distributions of arrays 300–330 are aligned at position 610 in optical system 10 by making adjustments in the alignment and the state of focus of illuminators 400–430.

Other embodiments of the invention, including additions, subtractions, deletions and other modifications of the preferred disclosed embodiments of the invention will be obvious to those skilled in the art and are within the scope of the following claims. For example, the function of anamorphic module 540 might be provided by optical elements which are distributed differently throughout optical system 10 as long as compensating changes which should be clear to those of ordinary skill in the art take place. In addition, the lenses in optical system 10 do not have to be simple lenses as have been described above. Further, as one of ordinary skill in the art can appreciate, several of the surfaces of optical system 10 may be made aspheric for purposes of aberration control.

What is claimed is:

1. A source of radiation for use in printing on a recording medium, said source comprising:
    at least one laser diode array having near and far field radiation distributions; and
    an optical system which is telecentric in at least one azimuth for providing an image of said near field distribution from said laser diode array substantially on the medium, said telecentric optical system comprising:
    an illuminator for providing a first image of said near field distribution at an intermediate image plane; and
    an optical system for reimaging said first image on the medium.

2. The source of claim 1 wherein said telecentric optical system comprises:
    an illuminator for providing an image of said near field distribution at an intermediate image plane;
    an anamorphic optical system which receives said intermediate image; and
    an objective optical system, which operates in conjunction with said anamorphic optical system, to reimage said intermediate image to provide the final image on the medium.

3. The source of claim 1 wherein said illuminator comprises a collimator and an objective optical system.

4. The source of claim 2 wherein said illuminator comprises a collimator and an objective optical system.

5. The source of claim 2 wherein said anamorphic optical system comprises a first cylindrical lens system and a second cylindrical lens system.

6. The source of claim 2 wherein said anamorphic optical system comprises at least one toric lens system.

7. The source of claim 1 wherein said telecentric optical system comprises a collimator, a first objective lens system, an anamorphic optical system which is telecentric in at least one azimuth, and a second objective lens system.

8. A source of radiation for use in printing upon a recording medium said source comprising:
    a plurality of phased array laser diodes;

optical means for combining the radiation from said phased array laser diodes for travel along a common optical path; and an optical system which is telecentric in at least one azimuth for providing an image of the near field distribution from said laser diode array on the recording medium.

9. The source of claim 8 where the combining means is an array of mirrors located at an intermediate image of the near field.

10. The source of claim 9 where prisms are used before the combining mirrors to correct aberrations in the anamorphic optical system.

11. A source of radiation for use in printing on a recording medium, said source comprising:
   at least one phased array laser diode having near and far field radiation distributions; and
   an optical system which is telecentric in at least one azimuth for providing an image of said near field distribution from said phased array laser diode substantially on the medium and for imaging said far field radiation distribution from said phased array laser diode at infinity.

* * * * *